(12) United States Patent
Echigo et al.

(10) Patent No.: US 7,231,088 B2
(45) Date of Patent: Jun. 12, 2007

(54) METHOD FOR TEAM PLAY ANALYSIS

(75) Inventors: Tomio Echigo, Yokohama (JP); Ken Masumitsu, Yamato (JP); Takaaki Murao, Yokohama (JP); Masayoshi Teraguchi, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 541 days.

(21) Appl. No.: 10/146,310

(22) Filed: May 15, 2002

(65) Prior Publication Data

US 2003/0048415 A1    Mar. 13, 2003

(30) Foreign Application Priority Data

May 15, 2001    (JP)    ............................. 2001-145685

(51) Int. Cl.
  *G06K 9/62* (2006.01)
(52) U.S. Cl. ...................... 382/225; 382/103; 348/700; 707/102
(58) Field of Classification Search ................ 707/102; 352/38; 382/103, 224, 225, 154; 345/952; 348/42, 47, 699, 700
See application file for complete search history.

(56) References Cited

U.S. PATENT DOCUMENTS 5,745,126 A * 4/1998 Jain et al. .................... 382/154
5,923,365 A * 7/1999 Tamir et al. ................. 348/169

OTHER PUBLICATIONS

Seo et al.,"Where are the Ball and Players? Soccer Game Analysis with Color-Based Tracking and Image Mosaick".*

Gong et al., "An Automatic Video Parser for TV Soccer Games", ACCV '95 Second Asian Conference on Computer Vision.*
Taki et al., "Development of Motion Analysis System for Quantitative Evaluation of Teamwork in Soccer Game", IEEE, 1996.*
Yow et al.; "Analysis and Presentation of Soccer Highlights From Digital Video"; 1995.*
Roget's New Millennium Thesaurus, First Edition (v 1.2.1), Copyright 2006 by Lexico Publishing Group, LLC.☐☐*

* cited by examiner

*Primary Examiner*—Matthew C. Bella
*Assistant Examiner*—Patrick Edwards
(74) *Attorney, Agent, or Firm*—Casey August; Anne Vachon Dougherty

(57) ABSTRACT

The object of the invention is to extract from a moving picture and display at least a portion of team play, especially in a field sport, that is considered to be important for detailed analysis, so that the teamwork involved is easily discerned. A team play analysis apparatus comprises: a multi-resolution team play extraction unit for extracting a multi-resolution team play based on the trajectory of a player in the moving picture; a multi-resolution team play display unit for displaying at least a part of the multi-resolution team play through the interaction with a content creator; a parameter adjustment acceptance unit for accepting, from the content creator, the adjustment of a resolution in the multi-resolution team play display unit and the selection of groups, which constitute a series of desired plays to be picked up as an event, and collaborated movement of the groups; and a team play display unit for displaying a team play that is prepared through the adjustment and selection that are accepted by the parameter adjustment acceptance unit.

10 Claims, 14 Drawing Sheets

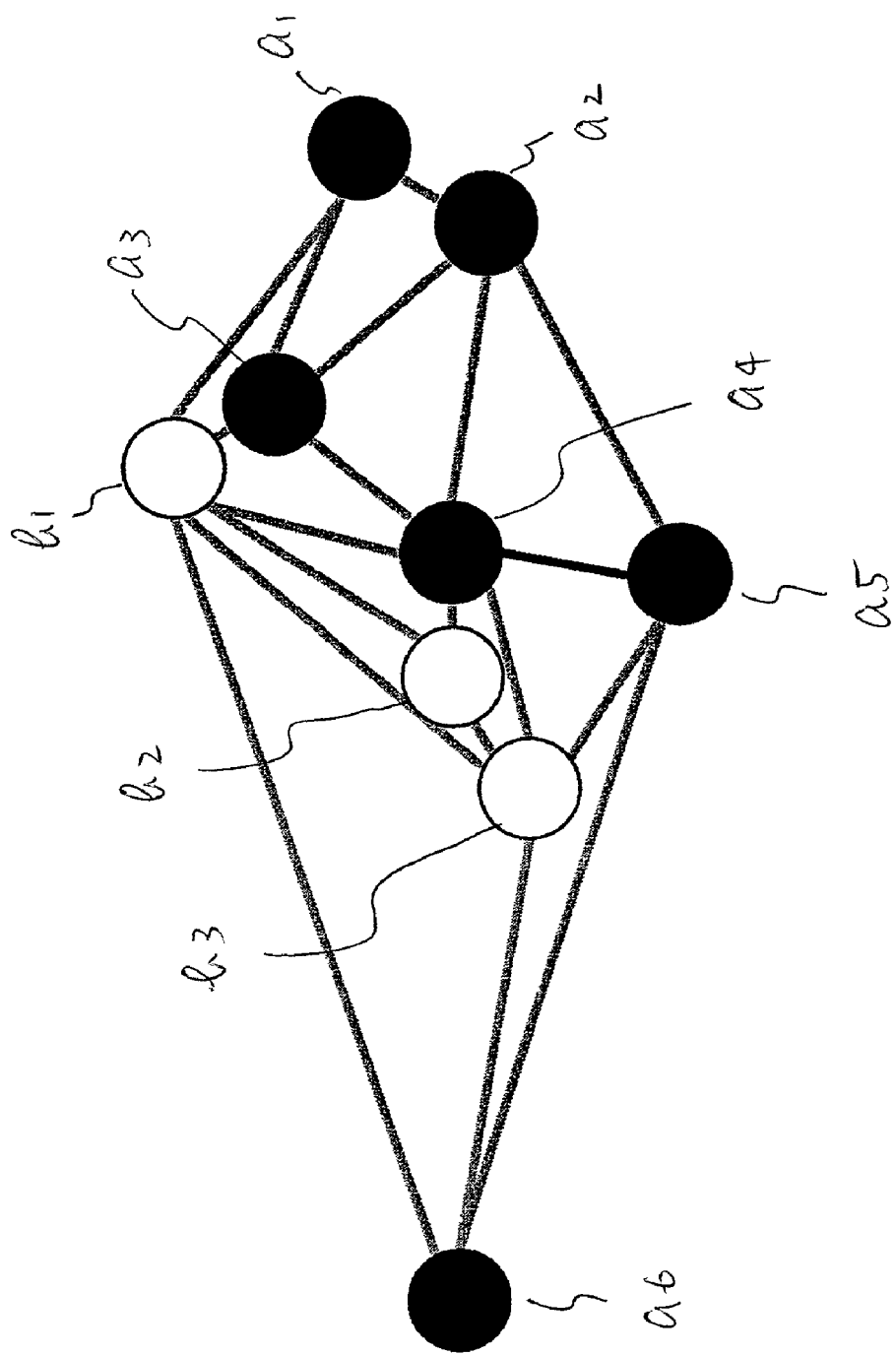

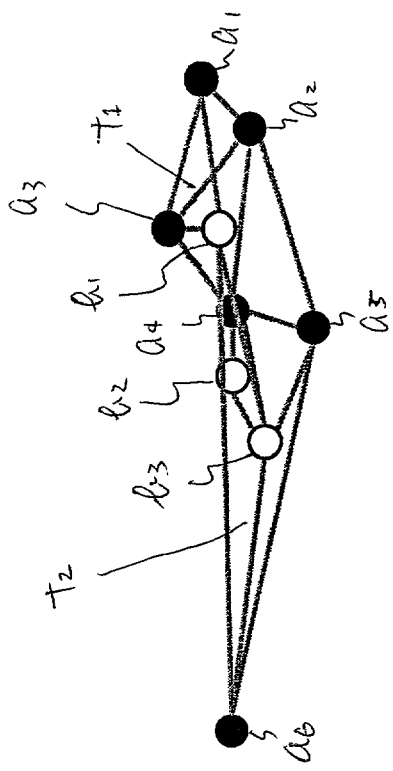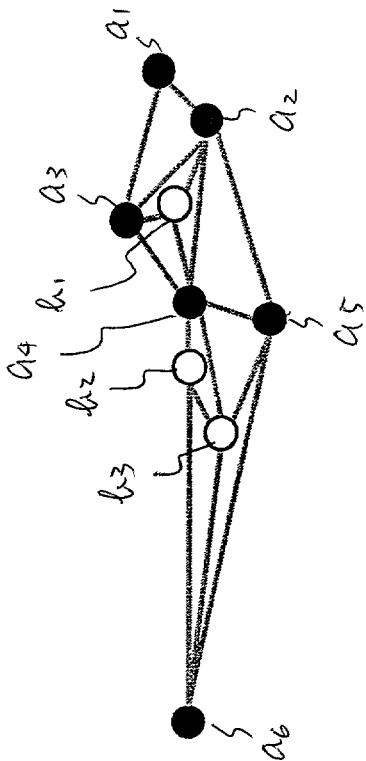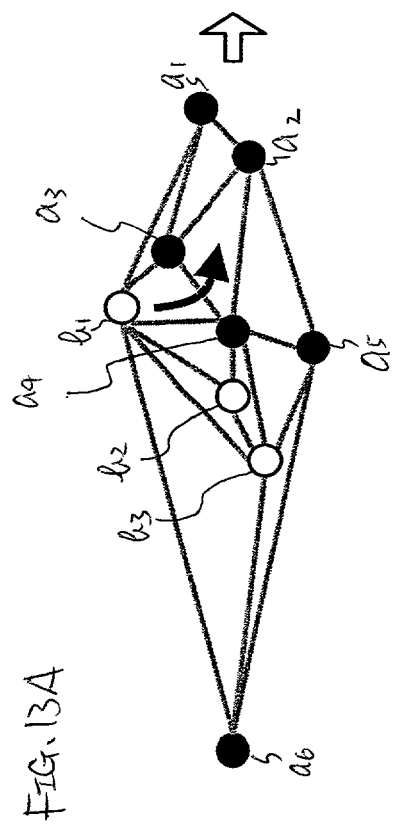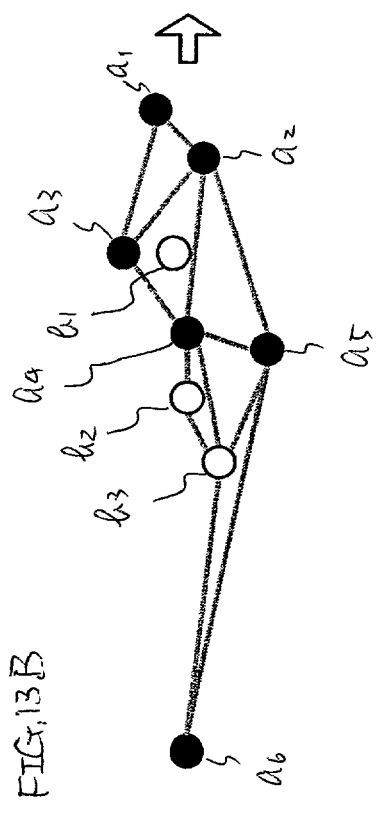
Fig. 13

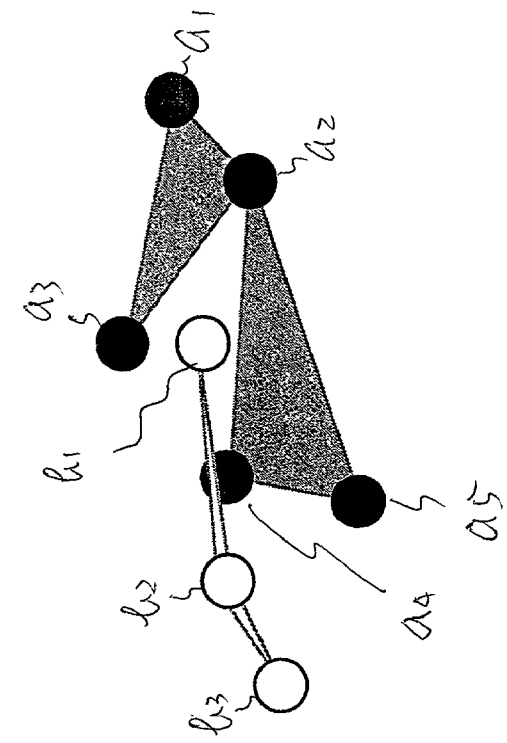
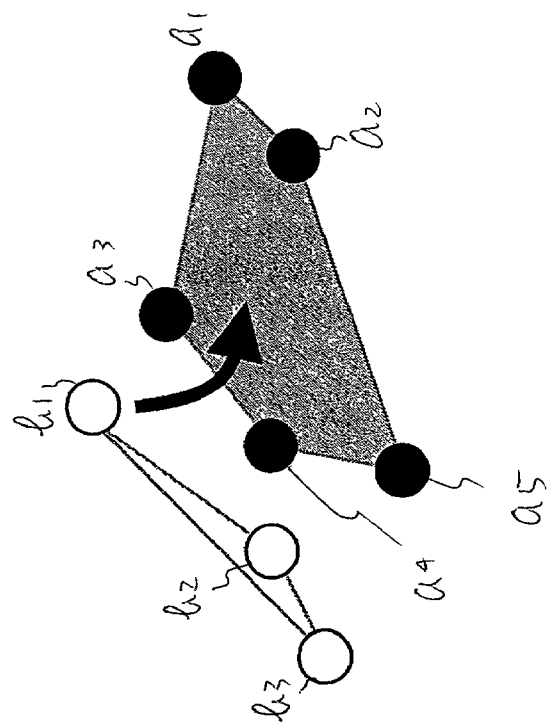
Fig. 14

METHOD FOR TEAM PLAY ANALYSIS

BACKGROUND OF THE INVENTION

1. Field of the Invention

The present invention relates to a team play analysis method, and in particular, to an optimal multi-resolution analysis method for extracting from a moving picture a team play sequence having certain size spatially and temporally, and for abstracting and displaying the team play sequence.

2. Description of the Related Art

Plays in team sports, such as soccer, rugby, American football, basketball, handball, hockey, ice hockey and water polo, unlike some other sports, tend to vary so rapidly as the game goes on. For these sports, the post-game study of team formations and player movements is of importance when team strategies and game results must be analyzed and understood.

To provide statistical information for team plays of field sports, conventionally, ranking services rely on an overwhelming concentration of human resources, to obtain and assemble scores and to analyze statistics. The performance of such indexing work, which requires a huge amount of workload, must perforce rely on a lot of inexperienced labor, and thus, under these circumstances, the information that is to be collected is limited to activities concerned, in most cases, with ball handling, since such events are easier for nonprofessional persons to judge.

Several studies are available wherein methods for visualizing team plays in field sports are disclosed. For example, in reference document 1 ("Qualitative Image Analysis of Group Behavior", T. Kawashima, K. Yoshino and Y. Aoki, Proc. of IEEE CVPR, 1994), a method is proposed whereby a Gaussian filter is used to hierarchically extract a group, to describe the behavior of the hierarchical group in advance and to employ the pre-described behavior to analyze the actual activities in which the group engages. In reference document 2 ("Development of Motion Analysis System for Quantitative Evaluation of Teamwork in Soccer Games", T. Taki, J. Hasegawa and T. Fukumura, Proc. of IEEE ICIP), a method is proposed whereby, while taking into account the direction of movement of runners, a first region that each player can reach is defined as a dominant region, and dominant region boundaries are displayed by using colored fields.

As is described above, according to the conventional visualization analysis, the only service that is provided is one that ranks players and teams during soccer games by concentrating on ball handling events. However, in reality, teamwork, which occurs at locations other than those at which ball handling events occur (locations at which there are no ball handling events), are significant and can greatly affect game progress. Especially, defense plays occur so often at such locations. For example, in the current ranking service for soccer, offense and defense events relative to a ball, and other events that have little or no direct relation to the actual plays, such as a foul and the awarding of a red card or a yellow card, can only be enumerated as events in the scoring table, and the indexes related to the play becomes mainly about offenses.

The ranks used in reference document 1 are determined temporarily with the presumption that the resolution can not be freely changed, and that the translation or interpretation of the group depends on the algorithm. Further, in reference document 2, since there is no ambiguous portion such as the "behavior" in reference document 1, the algorithm does not strongly affect the translation of an event. However, since the visualization of information is performed for each frame, the dominant regions in a time series must be manually interpreted in order to understand the team play.

As is described above, several methods have been proposed to fill the gap between the essence of the plays of the field sports and the indexing that is actually performed. However, as for a team play, that has a certain temporal size and for which the final interpretation of groups participating in an event and the collaboration within or between the groups must be done by human, there is no method present for appropriately handling the contents of the team play. For example, the method in the reference document 1 has many presumed portions, and is not appropriate for supporting the extraction of an event that is difficult to find. In reference document 2, while a display that corresponds to an actual play can be presented, it is limited to show a phenomenon for each frame, and visualization of a team play as the collaboration within and/or among player groups having a certain temporal size is not achieved.

To resolve the above conventional shortcomings, it is one object of the present invention to extract from a moving picture the team play that possesses width along the time axis, and to abstract and display it, so that the teamwork involved is easily discerned.

It is another object of the present invention to present, to a content creator, the teamwork within and/or among groups having multi-resolutions, so that more accurate information related to the team play can be obtained.

It is another object of the present invention to permit a content creator to select content that matches human interpretation, such as activities constituting the teamwork, so that content prepared by the content creator can be easily understood by a third party.

SUMMARY OF THE INVENTION

To achieve the above objects, according to one aspect of the present invention, all players, all player groups, their concerted movements, and the subject and the object of their actions are visualized abstractly to support a user to understand correlated plays in a sport. Specifically, according to the invention, a method for analyzing team plays in sports is provided, which comprises the steps of: extracting, from image data, such as video, each player and each player group participating in a team play at an arbitrary temporal resolution and/or an arbitrary spatial resolution; employing the displacement in positional relationship among players so as to extract the movement of the player and the player group at an arbitrary temporal resolution and/or an arbitrary spatial resolution; and displaying relation of the extracted movements in an abstracted manner, such as a diagram simply having points (nodes) and lines (sides). Teamwork is, for example, a coordinated or collaborated effort taken a plurality of members of the same team in a team play, and it also includes a play occurred in a place where there is no ball involved.

Further, the team play analysis method of the invention may comprise the steps of: forming a diagram that is subdivided into triangles while employing the players in each frame of video data as nodes; and merging and/or subdividing the triangles of the diagram or the sides thereof, to extract the groups at an arbitrary resolution, such as designated temporal and/or spatial resolution.

The team play analysis method may comprise the steps of: detecting topological changes (a displacement in the positional relationships of nodes, the merging of nodes and the splitting of nodes) that constitute changes of topological information in the diagram; and grouping the detected topological changes in time. This arrangement is preferable because a multi-resolution analysis of a movement associated with teamwork can be performed, and a team play movement can be extracted at an arbitrary temporal resolution, while the subject and the object of the movement can be readily perceived by examining the obtained movement.

According to another aspect of the invention, a team play display method comprises the steps of: extracting multi-resolution groups constituted by groups at an arbitrary spatial resolution, and collaborated movements in the multi-resolution groups obtained by the processing of the groups at an arbitrary temporal resolution; accepting the adjustment of a resolution by a content creator, and/or the selection of multi-resolution groups which constitute a series of plays to be icked up as an event and of the collaborated movements in the multi-resolution groups; and displaying, as the relation of the collaborated movements of abstracted players in the groups, a team play prepared through the adjustment and selection effected by the content creator.

While displaying one part of a multi-resolution team play, which has been extracted in accordance with the interaction of efforts, such as are designated by the content creator for threshold values and the ranges of a temporal resolution and a spatial resolution, the adjustment and selection are performed by the content creator based on the contents of a display and are then accepted.

A team play analysis apparatus according to the invention preferably comprises: a multi-resolution team play extraction unit for extracting a multi-resolution team play based on a trajectory of a player in obtained video data; a multi-resolution team play display unit for displaying at least one part of the multi-resolution team play in response to the interaction with a content creator; a parameter adjustment acceptance unit for accepting, from the content creator, the adjustment of a resolution in the multi-resolution team play display unit and the selection or setting up of groups, which constitute a series of desired plays to be picked up as an event, and the collaboration of the groups; and a team play display unit for displaying, as collaboration of abstractly displayed players in the groups, a team play prepared through the adjustment and selection that are accepted by the parameter adjustment unit.

According to an additional aspect of the invention, a team play analysis apparatus for analyzing a team play in a sport may comprise as a part of the multi-resolution team play extraction unit: a first extraction means for extracting, from obtained video data, players and player groups that participate in a team play at an arbitrary temporal resolution and/or an arbitrary spatial resolution; a second extraction means for employing the displacement in positional relationship among the extracted players so as to extract the movements of the players and the player groups at an arbitrary temporal resolution and/or an arbitrary spatial resolution.

According to the invention, a team play analysis apparatus comprises: multi-resolution group output means for generating, for each frame of image data, a team diagram wherein players of the same team are used as nodes, for updating the team diagram by reflecting the locations of the players in time series frames, and for outputting a set of the team diagrams as a multi-resolution group; and multi-resolution movement outputting means for generating, for each frame of the image data, a movement diagram wherein the players in each frame are used as nodes, for accumulating movement diagrams obtained by updating the topology of the movement diagrams in time series frames, and for outputting the accumulated result as a multi-resolution movement.

The present invention can also be provided as a program or program product for permitting a computer that can obtain and reproduce video data to implement the above described functions. This program or program product can be distributed, via a network, by a program transmission apparatus at a remote area to a computer that is a processing apparatus. The program transmission apparatus need only comprise: storage means, such as a CD-ROM, a DVD, a memory or a hard disk, on which the program is stored, and transmission means for reading the program from the storage means and transmitting it to a program execution apparatus via a connector and a network, such as the Internet or a LAN. The program or program product can also be provided by using a storage medium, such as a CD-ROM.

Further, a computer program or computer program according to the invention can be directly distributed product by using a storage medium, such as a CD-ROM or a DVD. At this time, a computer, such as a PC, in which the program is to be installed, need only include a function for reading the storage medium. The computer wherein the program has been installed can then perform the above described processes as one of the applications executed by the computer.

BRIEF DESCRIPTION OF THE DRAWINGS

FIG. 10 shows a diagram for explaining an example generated by the movement diagram generator of a multi-resolution team play extraction unit.

FIG. 13 shows diagrams for explaining a change in the positional relationship of players and a displacement in a diagram.

FIG. 14 shows a diagram for explaining an example of display for a running-in play.

DETAILED DESCRIPTION OF A PREFERRED EMBODIMENT OF THE INVENTION

Figure 1:
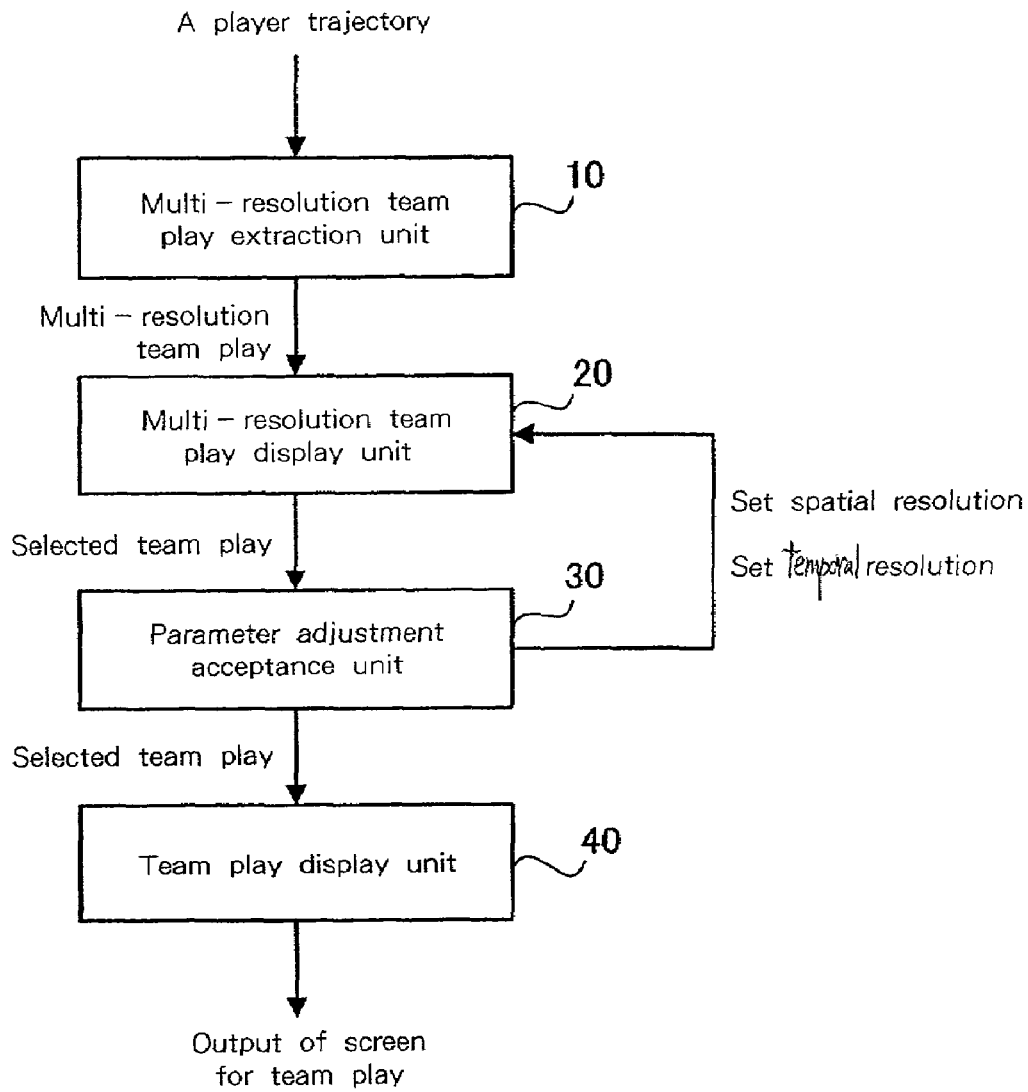
FIG. 1 shows a diagram for explaining the structure of a multi-resolution analysis system for a team play according to the embodiment.

The preferred embodiment of the present invention will now be described in detail while referring to the accompanying drawings.

According to the embodiment, a system for multi-resolution analysis of a team play can be provided as an application that is to be executed by a personal computer (PC). This system can be applied, for example, for an operation wherein video data are read for a PC by using a video capture apparatus, connected to a television or a video deck, that fetches and stores an image as a static picture or a moving picture, while the video data are digitized to extract trajectories or tracks of players.

In this embodiment, a team play having width along the time axis is extracted from a moving picture, such as video data, and is abstracted and displayed, so as to extract the teamwork composed by players. To extract the teamwork, the following elements must be understood and grasped:
(1) individual players and player groups that participate in the teamwork.
(2) movements of the players and the player groups in the teamwork.
(3) a subject of the teamwork related movements of the players and the player groups.
(4) an object of the teamwork related movements of the players and player groups.
(5) plays related with each other.

More specifically, these elements can be condensed and reduced to:
(1) the individual players and the player groups participating in the teamwork, and
(2) the movements of the players and the player groups in the team play.

This is true because, in a team play, the subject and object of each movement are obvious, if who is participating in the teamwork in certain time and/or space is apparent, and the individual plays that correlated with each other can be extracted as an interaction between the subject and the object of the movement. In this embodiment, while the temporal and spatial resolution is changed on demand, the above two elements are extracted in an arbitrary temporal and spatial resolution, and the abstracted elements are presented. In this manner, the elements can be identified.

In this embodiment, for understanding the "groups", player groups are extracted as multi-resolution groups, from which a group not at a fixed spatial resolution but at an arbitrary spatial resolution can be extracted, and a framework for handling the movement at an arbitrary temporal resolution is provided. Thus, the understanding and the extracting of the player groups that participate in a team play is supported.

Further, in this embodiment, for understanding the "movement of the group", the invention utilizes the fact that the topology of a model of a multi-resolution group for each frame is changed by a fluctuation in the location of a player. That is, when a framework for extracting a series of topological changes and for grouping the changes using an arbitrary temporal resolution is provided, a framework for extracting the movement, and the basis and the object of the movement, at an arbitrary temporal resolution, is provided to support the understanding and extraction of each play that constitutes a team play. It should be noted that for 30 Hz, for example, as the frame unit, the individual 30 frames can be identified in one second in obtained video data.

FIG. 1 is a diagram for explaining the configuration of a multi-resolution analysis system for a team play in accordance with the embodiment. This system comprises: a multi-resolution team play extraction unit 10, for extracting multi-resolution groups and a collaboration among the multi-resolution groups, and for generating a multi-resolution team play from the trajectory of a player; a multi-resolution team play display unit 20 for displaying a screen, including a slider for the entry of data by a content creator, and a portion of the multi-resolution team play that is extracted in accordance with user's selection obtained through interaction with users, such as the content creators (e.g., designation of a resolution by the content creator); a parameter adjustment acceptance unit 30, for accepting the selection or adjustment of a parameter received from the content creator's operation, such as the operation of the slider of the multi-resolution team play display unit 20; and a team play display unit 40, for displaying the team play prepared by the content creator as a linkage of the collaboration provided by the abstracted players. The content creator adjusts the resolution of the multi-resolution team play display unit 20, and selects the groups that constitute a series of plays to be assembled as an event, and the collaboration of the groups. As a result, a team play is prepared.

The multi-resolution team play extraction unit 10 extracts multi-resolution groups and multi-resolution movements (topological changes) that constitute the collaboration among the multi-resolution groups, and generates, from the trajectories of input players, a multi-resolution team play having a data form such that a set of players and the movements of the players can be extracted at an arbitrary spatial resolution and an arbitrary temporal resolution. Based on the generated multi-resolution team play, the multi-resolution team play display unit 20 displays the movement of a player in accordance with the spatial resolution and the temporal resolution that are designated by the content creator.

The content creator sets or selects the spatial resolution and the temporal resolution while watching the screen, so as to extract a set of appropriate players and the movements of the players, and the parameter adjustment acceptance unit 30 accepts the data entry. The temporal resolution to be input is, for example, "XX seconds", and the spatial resolution to be input is, for example, "within a range of XX meters". When these are arbitrarily set, an "arbitrary resolution" can be selected for both time and space. The multi-resolution team play display unit 20 reflects the spatial resolution and the temporal resolution that are selected, and outputs, as a selected team play, a set of players and the movements of the players that are extracted at the resolutions set by the content creator. The team play display unit 40 overlays on the real image a set of players and the movements of the players, which are selected by the content creator, or displays them on the plan view of the field, so that the team play is output to the screen to help an audience understand the team play.

Figure 2:
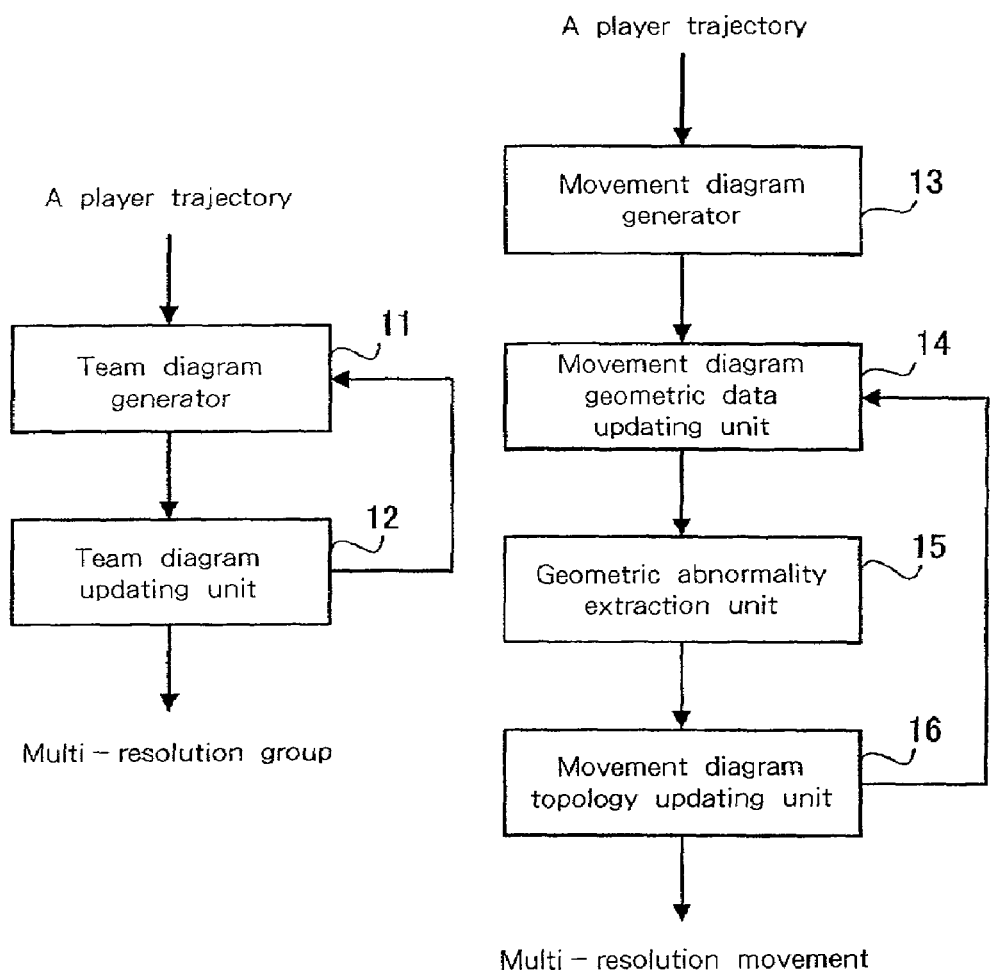
FIG. 2 shows a detailed block diagram for explaining a multi-resolution team play extraction unit.

FIG. 2 is a detailed block diagram for explaining the multi-resolution team play extraction unit 10. For each frame, the multi-resolution team play extraction unit 10 outputs a multi-resolution team play as a pair of data on a multi-resolution group and a multi-resolution movement. The multi-resolution group is a set of players having multiple spatial resolutions, and the multi-resolution movement is the movement of players having multiple temporal resolutions. The multi-resolution team play extraction unit 10 performs processes for these two categorizes. While the multi-resolution team play extraction unit 10 receives the trajectories or tracks of the players, a team diagram generator 11 and a team diagram updating unit 12 output the multi-resolution group. Further, the trajectories or tracks of the players are received for each frame and the multi-resolution movements are output through a movement diagram generator 13, a movement diagram geometric data updating unit 14, a geometric abnormality extraction unit 15 and a movement diagram topology updating unit 16. The loops in FIG. 2 are the processes performed for each frame.

The team diagram generator 11 employs the input trajectories of the players to generate, for each frame, a team diagram wherein all the players of the same team are presented as nodes. In order to generate the diagram from the positional information of the players included in the trajectory data, the known Delaunay triangulation technique is employed.

The team diagram updating unit 12 reflects, on the team diagram, the locations of the players for each frame When the vertex of a certain triangle is present along or within the circumscibed circle of each triangle that forms the team diagram, triangles having the pertinent vertex in common and the edges (ridge line) of the triangle which has the pertinent circumscribed circle are deleted, and a new frame of team diagram is output by using the vertex of the deleted triangle and again using the Delaunay triangulation. A set of the team diagrams that are updated in this manner are output in a time series, through one of the two processes performed by the multi-resolution team play extraction unit 10, as a multi-resolution group.

As the other process, the movement diagram generator 13 outputs a movement diagram that is prepared without distinguishing different teams, in which players in each frame of the trajectories are employed as nodes. As well as being employed for the team diagram generator 11, the Delaunay triangulation technique is employed for the portion for which the diagram is generated using the nodes.

Further, in the movement diagram, when the edges (ridge lines) connect the players of different teams can be removed by exchanging them, this exchange is performed using a quadrangle formed of adjacent triangles. In addition, direction data is provided so that all the normal vectors of sides of the triangles that constitute the extracted diagram extend in the same directions.

Figure 3:
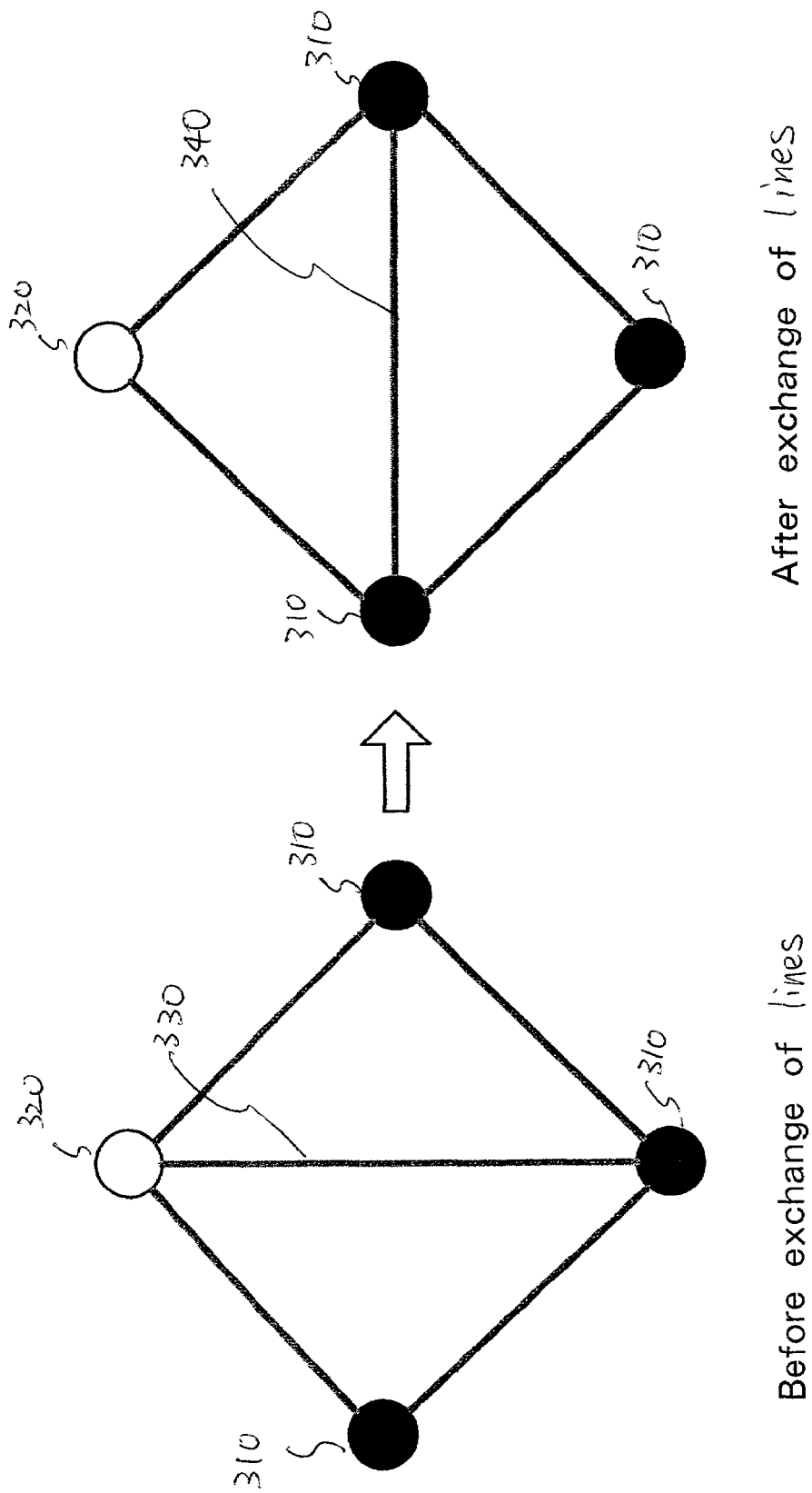
FIG. 3 shows a diagram for explaining the exchange of ridge lines.

FIG. 3 is a diagram for explaining the exchange of ridge lines. In this example, a movement diagram is so prepared that players on the first team, indicated by black dots 310, and a player on the second team, indicated by a white dot 320, are not distinguished from each other, and the ridge line 330 between the players in different teams is removed from the movement diagram by the line exchange with the line 340.

The movement diagram geometric data updating unit 14 employs, for each frame, the positional information for a player that is included in the player's trajectory and updates only the geometric data of a node, while leaving the topology of the diagram unchanged.

The geometric abnormality extraction unit 15 determines the presence or absence of a triangle, in which the direction of the normal vector in the movement diagram is inverted. If there is an inverted triangle, the displacement of the direction vector of the sides before and after the inversion is employed to obtain a node that has caused the inversion of the direction of the normal vector of the triangle. The evaluation of the node that is the cause of the inversion is performed by using an evaluation function that is defined for the i-th node as follows, and the node having the greatest evaluation function value is determined to be the cause of the inversion.

$$D_i = \sum_j |e_{n,i,j} - e_{n+1,i,j}| \qquad \text{[Equation 1]}$$

wherein $e_{n,i,j}$ denotes a set of vectors for the n-th frame in a movement diagram, wherein the i-th node is a start point and the other nodes having the sides in common are end points.

Finally, the movement diagram topology updating unit 16 deletes the ridge lines, which are connected to the node that is detected by the geometric abnormality extraction unit 15 as the cause of the inversion of the direction of the triangle. The movement diagram topology updating unit 16 further subdivides, into triangles, the hole formed by the deletion, and subdivides the triangle that newly encloses a node into triangles. The result of the topological operation is output to the movement diagram geometric data updating unit 14, and is used for the following updating process.

Figure 4:
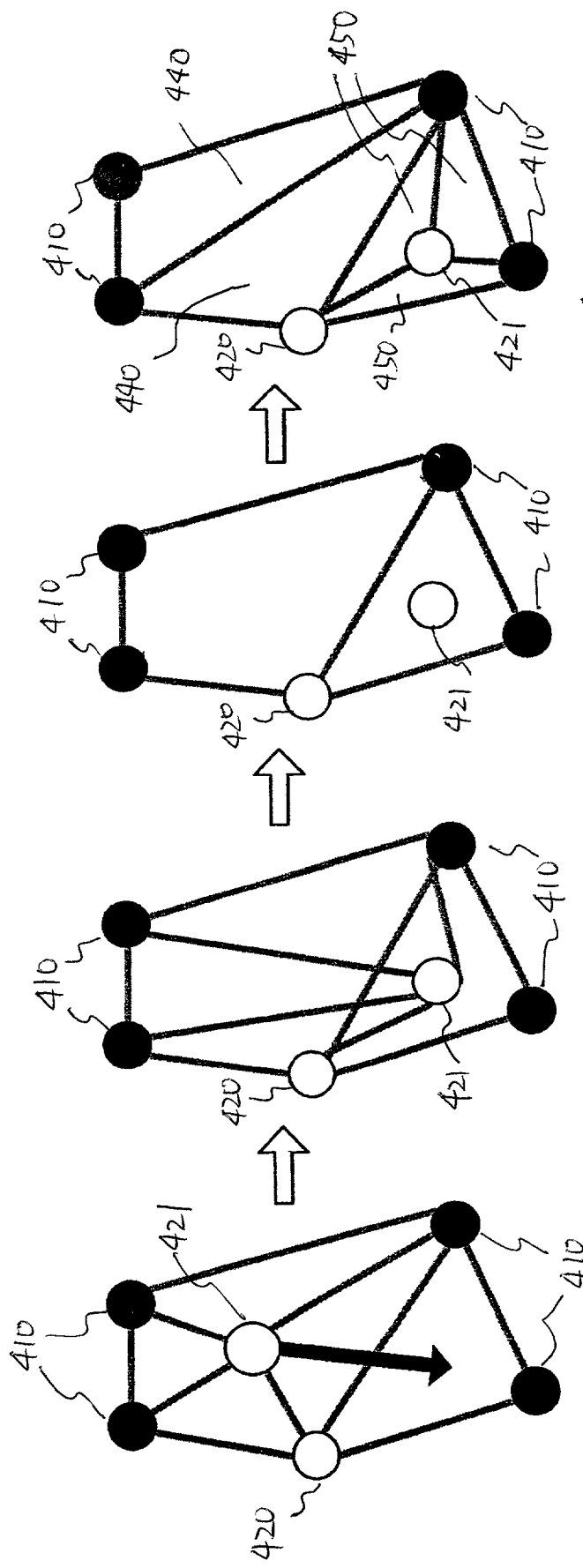
FIG. 4 shows a diagram for explaining the state of a process performed by a movement diagram geometric data updating unit.

FIG. 4 is a diagram for explaining the processing performed by the movement diagram geometric data updating unit 14. In this example, players on the first team are indicated by black dots 410, and players on the second team are indicated by white dots 420 and 421. First, in FIG. 4A, a movement diagram is prepared without one team being distinguished from the other. In FIG. 4B, the player on the second team indicated by the white dot 421 is moved, and only the geometric data of the nodes are updated while the topology of the diagram is maintained. In FIG. 4C, the lines connected to the node that causes the inversion of the direction of the normal vector in the triangle (FIG. 4B, 430) are deleted. In FIG. 4D, a hole formed by the deletion is again subdivided into triangles (440), and a new triangle that encloses the node is subdivided into triangles (450).

Figure 5:
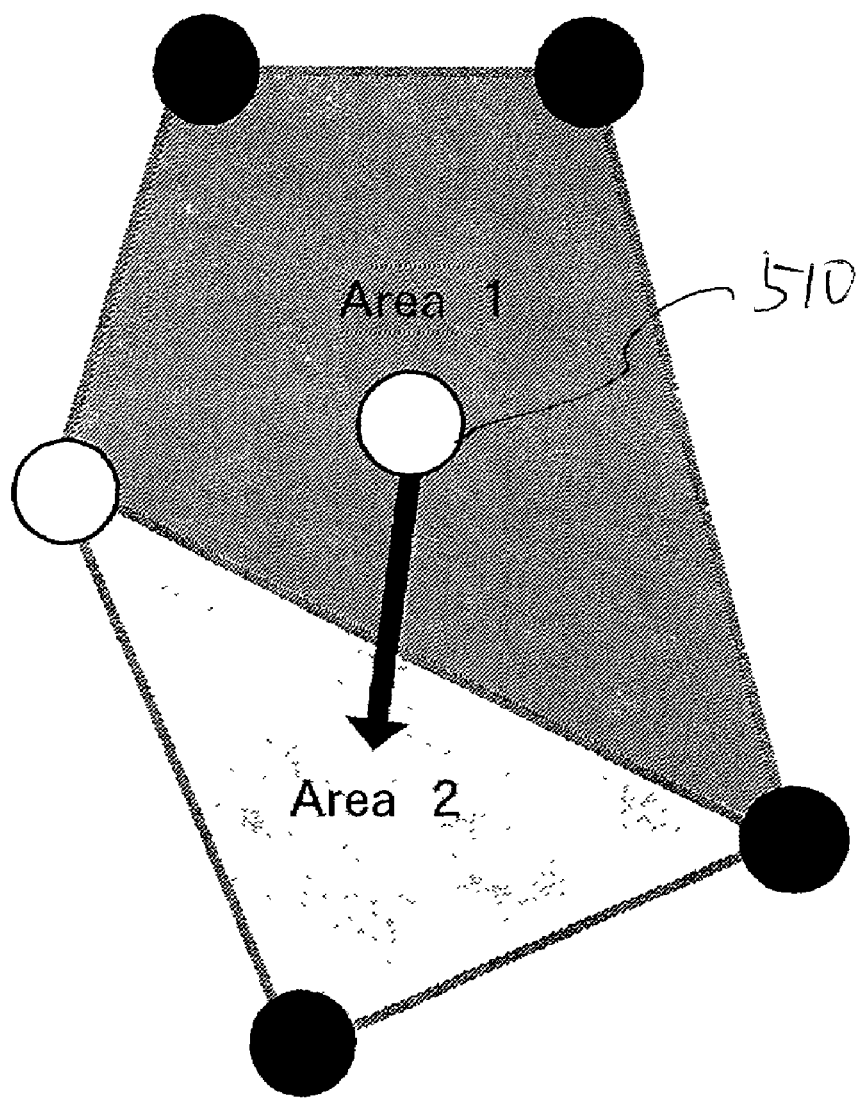
FIG. 5 shows a diagram for explaining a method of holding a topological change in the state in FIG. 4.

FIG. 5 is a diagram for explaining the method for holding the change of a topology in the state shown in FIG. 4. In the state shown in FIG. 4, as is shown in FIG. 5 the movement of the player at a certain node 510 is extracted as a shift from area 1, constituted by triangles that are deleted using the above process, to area 2, which is a new triangle enclosing the node. The thus extracted movements are accumulated as the movements of the nodes and the movement diagram, in a time series, to become an output as a multi-resolution movement through the other process performed by the multi-resolution team play extraction unit 10.

The processing performed by the multi-resolution team play display unit 20 will now be described in detail.

Figure 6:
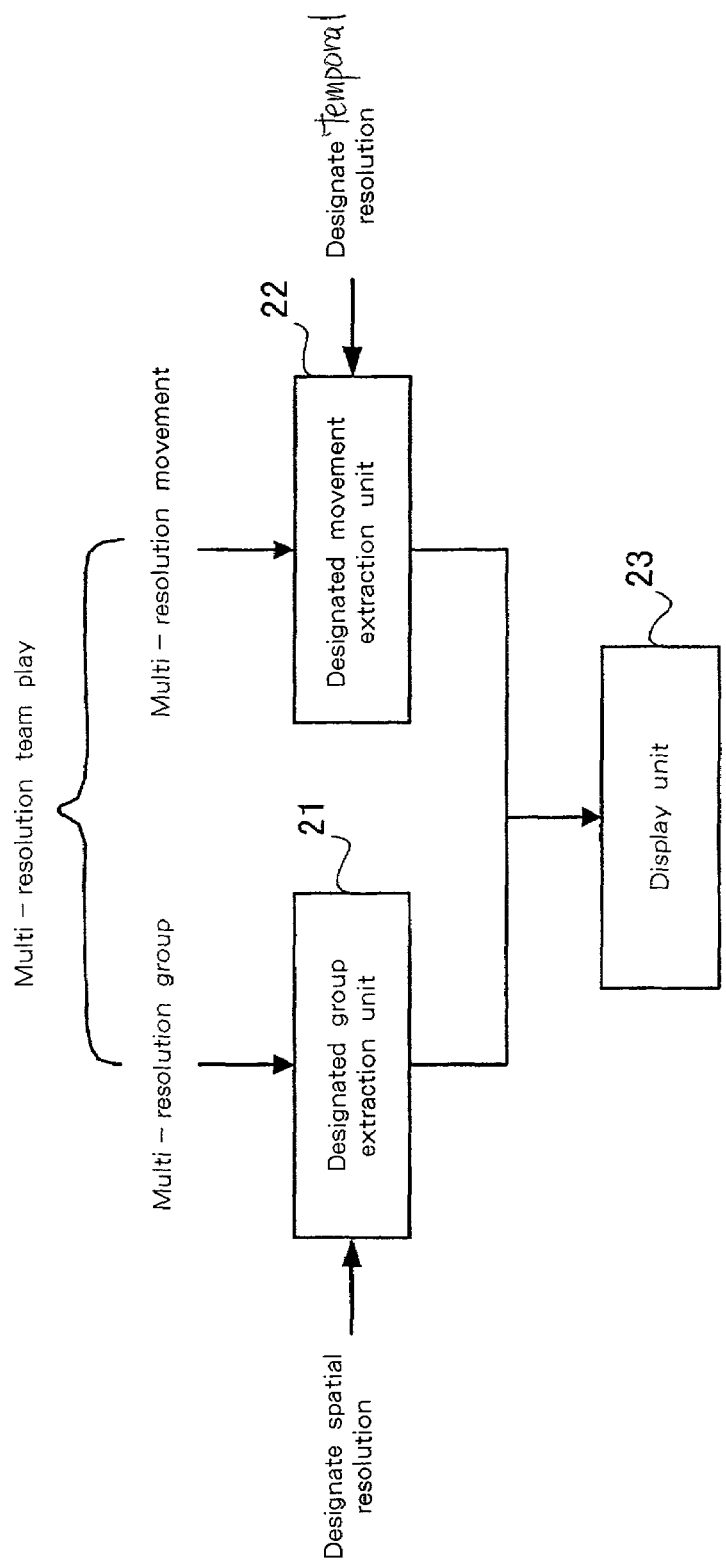
FIG. 6 shows a detailed block diagram for explaining a multi-resolution team play display unit.

FIG. 6 is a detailed block diagram for explaining the multi-resolution team play display unit 20. The multi-resolution team play display unit 20 generates a diagram wherein the extracted topological changes are used as nodes, in accordance with the distances in the temporal space of the topological changes. The multi-resolution team play display unit 20 comprises a designated group extraction unit 21, a designated movement extraction unit 22 and a display unit 23. The designated group extraction unit 21 accepts a spatial resolution designated by a user, and generates a set of players at the accepted spatial resolution using the multi-resolution groups in the multi-resolution team play that is extracted by the multi-resolution team play extraction unit 10. The designated movement extraction unit 22 generates a movement at the temporal resolution designated by a user by employing multi-resolution movements that are output through the process by the multi-resolution team play extraction unit 10.

Figure 7:
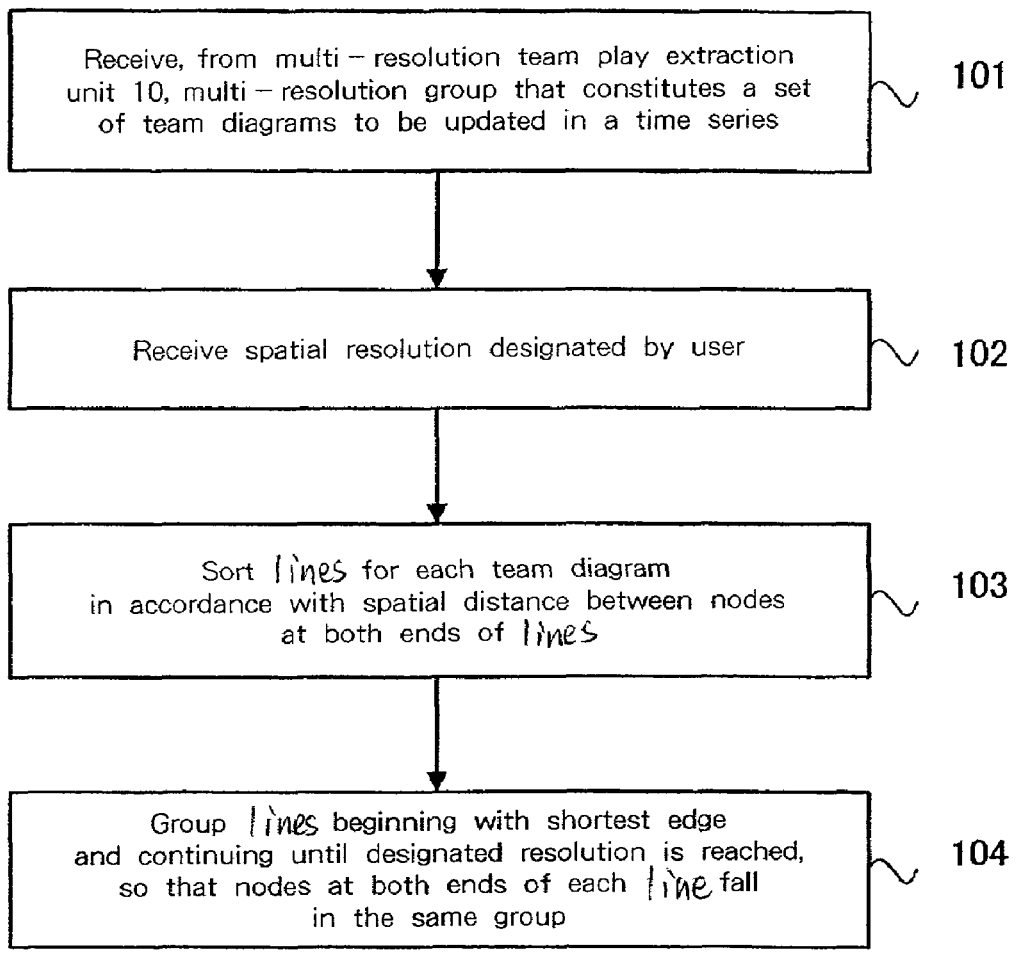
FIG. 7 shows a flowchart for explaining the processing performed by a designated group extraction unit for generating a set of players.

FIG. 7 is a flowchart showing the processing performed by the designated group extraction unit 21 when generating a set of players. First, the designated group extraction unit 21 receives, from the multi-resolution team play extraction unit 10, a multi-resolution group constituted by a set of team diagrams updated in a time series (step 101). Further, a spatial resolution is input that is designated by the user and accepted by the parameter adjustment acceptance unit 30 (step 102). Based on these input data, for each team diagram, the ridge lines (the lines connecting nodes) are sorted in accordance with the spatial distance between the nodes at both ends of each ridge line (step 103). Until the designated resolution is reached, ridge lines are grouped beginning with the shortest one, so that the nodes at both ends of each line fall in the same group (step 104). Through this processing, a set of players in the designated spatial resolution can be generated using the multi-resolution groups in the extracted multi-resolution team play.

Figure 8:
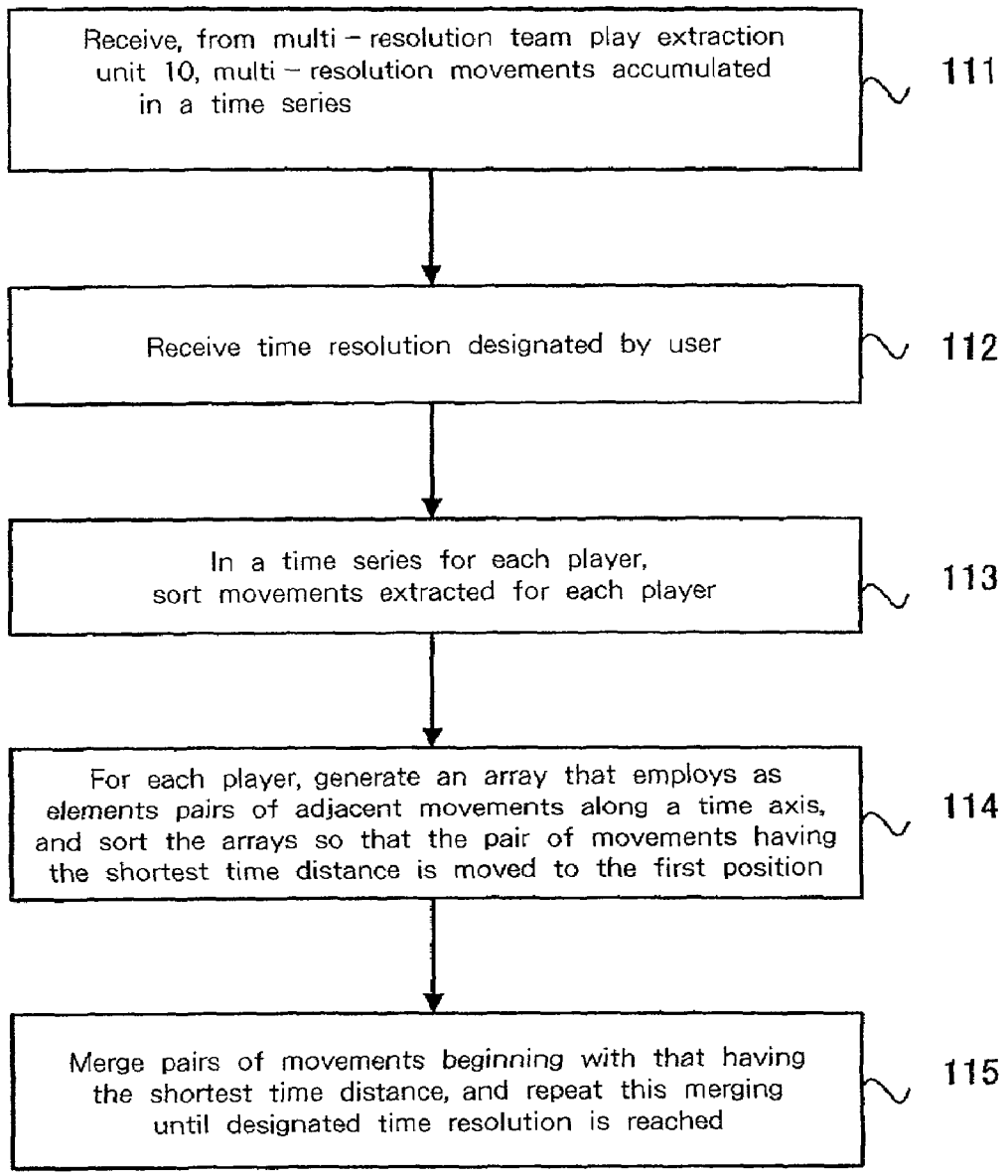
FIG. 8 shows a flowchart for explaining the processing performed by a designated movement extraction unit for generating a set of players.

FIG. 8 is a flowchart showing the processing performed by the designated movement extraction unit 22 when generating a set of players. First, the designated movement extraction unit 22 receives, from the multi-resolution team play extraction unit 10, data on the multi-resolution movements obtained by accumulating the extracted movements in a time series as movements of the movement diagram and the nodes (step 111). Further, the temporal resolution is input that is designated by the user and accepted by the parameter adjustment acceptance unit 30 (step 112). Based on these data, the movements extracted for each player are sorted in a time series for each player (step 113). Then, the arrays that employ, as elements, the pairs of adjacent movements along the time axis are generated for the individual players, and are sorted so that the movement pair having the shorter time distance is moved to the former position (step 114). Finally, the movement pairs are merged beginning with the one having the shortest time distance, and this merging is repeated until the designated temporal resolution is reached (step 115). Through this processing, the movement in accordance with the temporal resolution designated by the user is prepared.

The display unit 23 displays, as an animation, the designated group extracted by the designated group extraction unit 21, and a play that is a series of movements extracted by the designated movement extraction unit 22. The display unit 23 shows which group is directed toward which group in a time series. The content creator appropriately groups players and plays, while adjusting the temporal and spatial resolution, and selects only a meaningful portion from the multi-resolution team play. This selected portion is transmitted to the parameter adjustment acceptance unit 30, and is reflected in the display presented by the display unit 23.

Finally, the team play display unit 40 in FIG. 1 employs only the display unit 23 of the multi-resolution team play display unit 20 to display a combination of a player set and movement that are selected by the content creator. In this example, not only the abstracted group and its movement, but also the territory of each group is displayed as a Voronoi diagram, so that the understanding of the team play can be enhanced.

When the topological changes are comprehensively grouped, the teamwork in the individual plays that interact with each other can be extracted as a chain of the subjects and objects of the movements in the team play. When a team play having a multi-resolution in the temporal space is visualized and only the meaningful portion is selected by a user, a "play performed in a place whereat a ball does not exist" can be extracted. Further, a "play performed in a place whereat a ball does not exist" can be easily understood by a third party because the players are abstracted as groups, and the subject and object of the movement of each group and the correlation of the individual movements are abstracted on the display.

As is described above, in this embodiment, in order to understand a team playing field sports, means is provided to help
(1) understand individual players and player groups participating in the teamwork, and
(2) understand the movements of the players and the player groups.

More specifically, in this embodiment are provided a system for extracting and displaying a group of players at an arbitrary temporal resolution, and a system for employing a change in the positional relationship of the players to extract and display individual movements during an arbitrary temporal resolution. In order to easily understand these systems, the above embodiment will be described in more detail by using examples.

In this embodiment, for analyzation, the trajectory or track of a player is extracted from a moving picture of a team sport (field sport, etc.) and is input.

Figure 9:
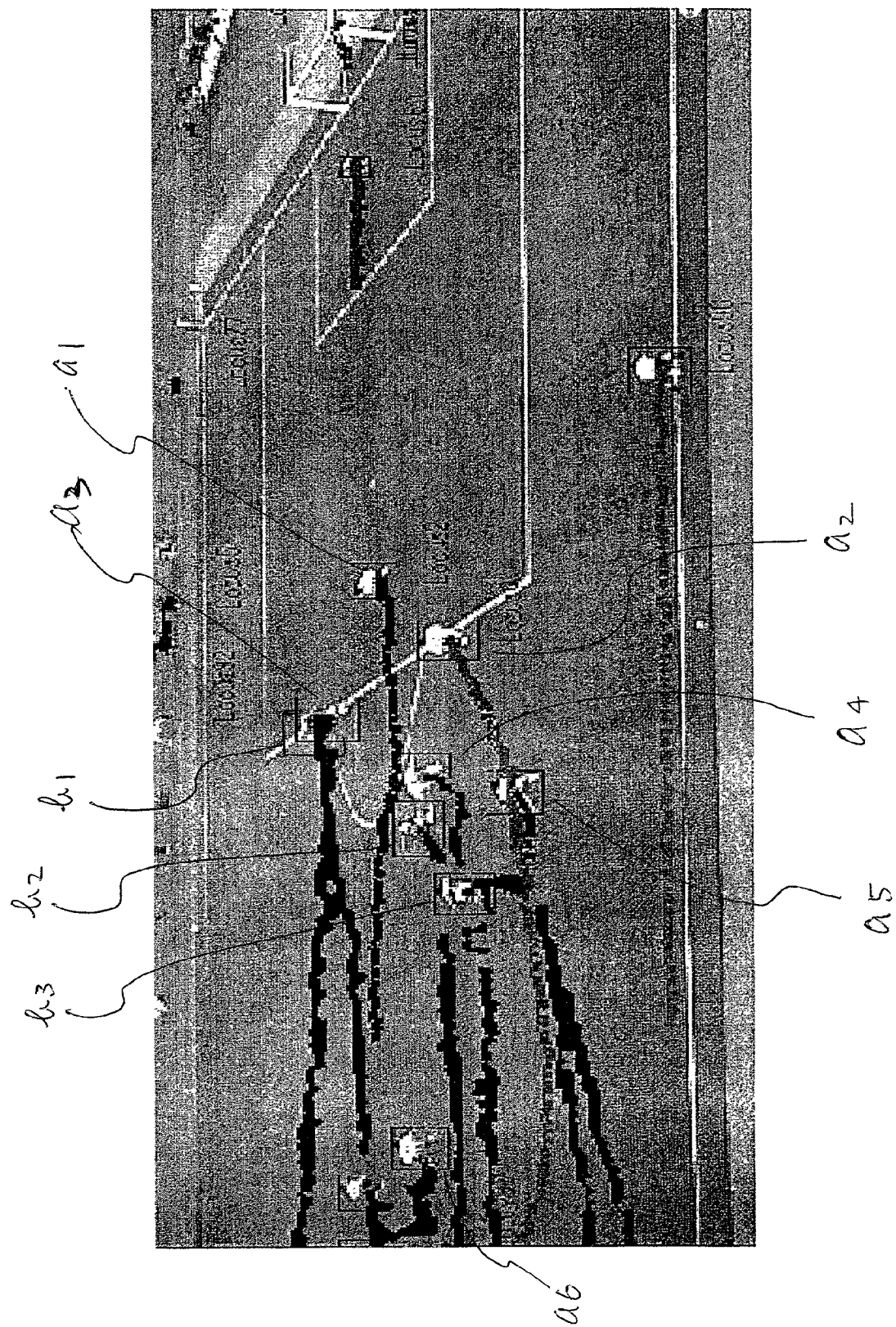
FIG. 9 shows a diagram for explaining an example of player trajectories.

FIG. 9 is a diagram showing a soccer game wherein the trajectories of players (a1–a6, b1–b3) are displayed in a video capture mode, for example. As a necessary condition for the trajectories of players that are to be input, the team must be identified, although the individuals need not always be identified. This is very important as for the generation of contents, because an occlusion process that always becomes a problem during the extraction of a trajectory and that requires much manual labor can be removed.

In FIG. 10 is shown an example diagram that is generated by the movement diagram generator 13 of the multi-resolution team play extraction unit 10, based on the trajectories of players in FIG. 9. In this figure, the same reference numbers are assigned to respective nodes as shown in FIG. 9. The movement diagram generator 13 generates a Delaunay diagram using a restrictive condition whereunder players (a1–a6, b1–b3) extracted from the player input trajectory data are used as nodes. The diagram in this embodiment is generated by providing, for the Delaunay diagram, a restriction in which lines between nodes (a1–a6, b1–b3) are created so that the three vertexes of the triangle indicate the players in the same team as much as possible, and by providing the direction for the Delaunay diagram using the individual triangles. As a result, the information of individual players that is included in the trajectory data along the time axis, and the relationships among the individual players in the spatial direction are established. In FIG. 10, the diagram for the thus generated frame is shown. It should be noted that, to provide the direction for triangles, the counterclockwise direction of the triangle is defined, for example, as the forward direction, and that a change in each triangle can be identified by observing a directed vector.

Based on the diagram, for each frame, neighboring players are connected by lines for which the above restriction applies. When the resolution for grouping is changed in accordance with the length of an line and the size of each triangle, the spatial resolution for grouping can be changed on demand. Further, the resolution for the group along the time axis (temporal resolution) can be changed in accordance with the positional information in a time series that is included in the trajectory data for each player.

Figure 11A:
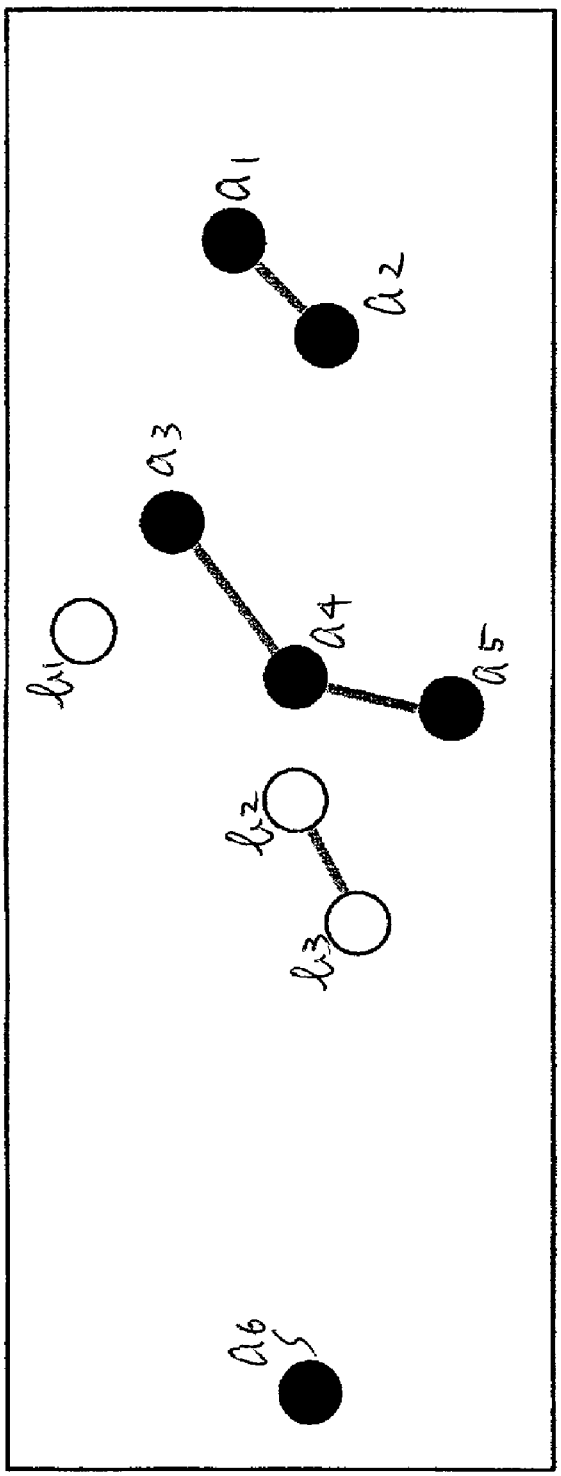
FIG. 11 shows diagrams for explaining examples wherein groups having different spatial resolutions are extracted from a diagram.
Figure 11B:
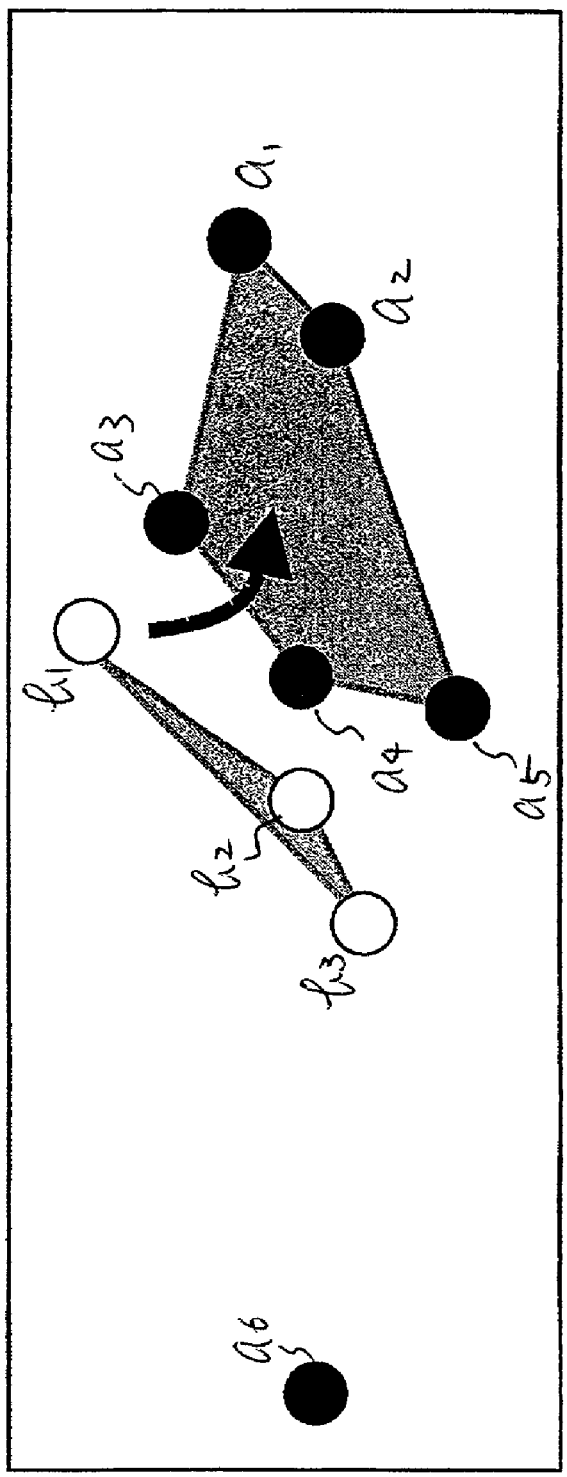

FIG. 11 is a diagram showing the state wherein groups having different spatial resolutions are extracted from a diagram. In FIG. 11, the players of a first team (a1–a6) and the players of a second team (b1–b3) constitute the defense and offense, respectively. In FIG. 11A, are shown two groups (a1–a2, a3–a5) as the first team on the defense side and two groups (b1, b2–b3) as the second team on the offense side. In FIG. 11B, the first team (a1–a5) and the second team (b1–b3) are respectively indicated as groups. Further, when a Voronoi diagram, the topology of which is paired with that of the diagram, is prepared, or when the portions of the diagram are colored in accordance with the triangles forming the diagram or the teams to which the vertexes (players) belong, the territories of the teams at an arbitrary resolution can be visualized. In this embodiment, unlike the conventional technique, the feature is that the territories can be visualized for a multi-resolution. That is, in this embodiment, the territory for an arbitrary resolution can be visualized on demand.

The multi-resolution analysis for a movement can be performed by extracting the changes of topology due to the displacement in the positional relationship of the nodes in the diagram, and by grouping the displacements in accordance with the temporal and spatial distance. The topological change in the diagram corresponds to a change in the status of the team play. When these status changes are grouped at an appropriate temporal resolution, the timing for the team play, the players involved in the team play and the object of the team play can be extracted.

Figure 12:
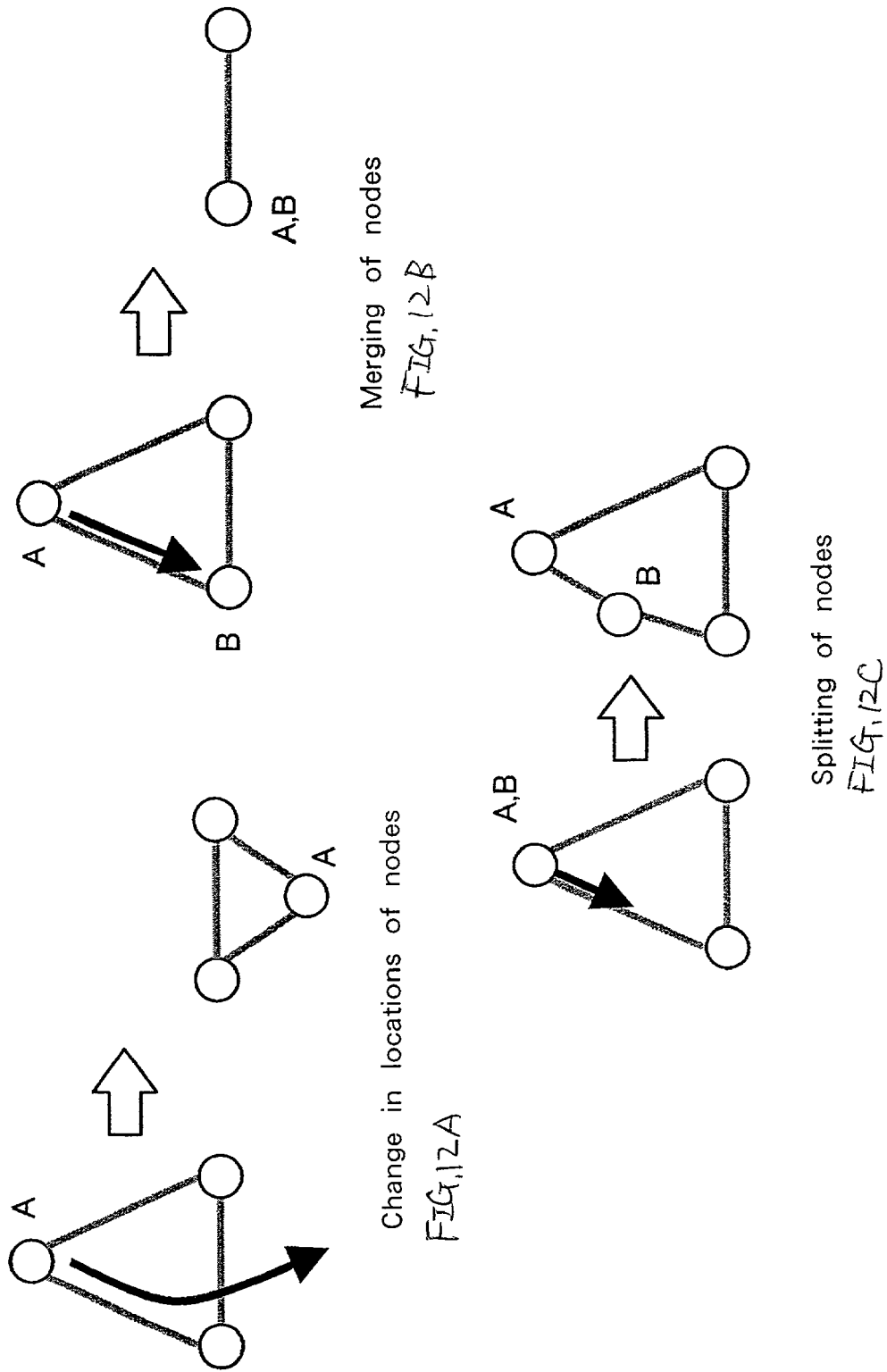
FIG. 12 shows diagrams for explaining a topological change to be extracted in this embodiment.

FIG. 12 is a diagram showing the topological changes to be extracted in this embodiment. In FIG. 12A, a change in the locations of the nodes is shown, and this change is caused by the movement of a player A. In FIG. 12B, the merging of nodes is shown, i.e., players A and B are overlapping, and the topological change when the nodes are merged is shown. In FIG. 12C, the splitting of nodes is shown, i.e., the player B is separated from the player A, while these players have been understood as one node. So long as only the team is identified for the trajectories of the players to be input, the merging of the nodes in FIG. 12B and the splitting of the nodes in FIG. 12C are included in the trajectory data, so that a positional change of the nodes can be easily extracted. Further, if the respective players are identified for the trajectory data, the positional change can be easily detected in accordance with the distance between the nodes in one frame. The positional change of the remaining nodes can be extracted using the following method.

FIG. 13 is a diagram showing a change in the positional relationships of the players and the topology of the diagram. In FIG. 13A, a geometric inconsistency or contradiction occurs due to the movement of player b1, and in FIG. 13B, a topological operation for removing this geometric abnormality is performed. Assume that, with the positional relationships shown in FIG. 13A, player b1 moves in the direction indicated by an arrow. If the diagram is shifted while the topology is maintained, a geometric contraction occurs in triangles having the node A in common, such as the inversion of a face (e.g. t1) and the intersection of triangles (e.g. t2). When this abnormality is extracted by the geometric abnormality extraction unit 15 in FIG. 2, the movement diagram topology updating unit 16 deletes the triangle having the node A in common with the other triangles and performs new triangle division, as shown in FIG. 13B.

Through this process sequence, the topological change can occur on the periphery of the node A before and after the node A is moved. When the topological change in the diagram is detected, the node the location of which is changed relative to the peripheral player can be extracted. In this embodiment, tiny changes in the formation are extracted as the minimum team play unit, and a start point and an end point are extracted in temporal space. By grouping the minimum units of players in accordance with an arbitrary temporal space resolution, a more abstracted play or a play that affected a significant change for the formation can be extracted. The extraction of a play that provided a significant change in the formation can be performed by defining the importance level relative to each change in the diagram.

FIG. 14 is a diagram showing an example display for a running-in play. As is shown in FIG. 14, the movement of player b1 in a second team group that is indicated by white dots (b1–b3) greatly affects the change in the shape of the first team group that is indicated by black dots (a1–a5). In this embodiment, this change is detected, and the play shown in FIG. 14 can also be presented as a play that is related to this change.

As is described above in detail, in this embodiment, since the players are grouped on demand using a diagram and the teamwork for a team play is detected using the topological change of the diagram, the play performed at a place where a ball does not exist can be found more easily than when a moving picture is directly evaluated.

As is described above, according to the present invention, a team play having width along the time axis is extracted from a moving picture, and the abstract of the team play is displayed, so that the teamwork can be easily extracted.

What is claimed is:

1. A method for team play analysis comprising the steps of:
    automatically extracting, from image data, each player and each player group participating in a team play at a first resolution;
    employing a displacement in a positional relationship among players so as to automatically extract movements of said each player and said each player group at the first resolution; and
    displaying a relationship of the extracted movements in an abstract manner;
    wherein said extracting step comprising the steps of:
    forming a diagram that is subdivided into triangles while employing the players in each frame of the image data as nodes; and
    extracting the groups at the first resolution by a step of modifying said triangles of said diagram, wherein said step of modifying triangles is selected from the group of steps consisting of merging triangles and subdividing triangles.

2. The method according to claim 1, wherein said first resolution is a spatial resolution.

3. The method according to claim 1, wherein said first resolution is a temporal resolution.

4. The method according to claim 1, wherein said employing step comprises the steps of:
    detecting topological changes that constitute changes of topological information in said diagram; and
    grouping said detected topological changes.

5. The method according to claim 4, wherein said topological changes are at least one of the change in the location of the node, the merging of nodes and the splitting of nodes.

6. An apparatus for team play analysis comprising:
    a multi-resolution team play extraction unit for automatically extracting a multi-resolution team play based on a trajectory of a player relative to other players in image data;
    a multi-resolution team play display unit for displaying at least a part of said multi-resolution team play in response to an interaction with a user; and
    a parameter adjustment acceptance unit for accepting a user's selection of a resolution in said multi-resolution team play display unit, of groups which constitute a series of desired plays to be picked up as an event, or of collaborated movements in said groups;

wherein said extraction unit comprises component for performing the steps of:

forming a diagram that is subdivided into triangles while employing the players in each frame of the image data as nodes; and extracting the groups at the first resolution by a step of modifying said triangles of said diagram, wherein said step of modifying triangles is selected from the group of steps consisting of merging triangles and subdividing triangles.

7. The apparatus according to claim 6, further comprising:

a team play display unit for displaying, as a relationship of the collaborated movements of abstracted players in said groups, a team play prepared through said user's selection that is accepted by said parameter adjustment unit.

8. The apparatus according to claim 6, said multi-resolution team play extraction unit comprising:

a first extraction means for extracting, from the image data, players and player groups that participate in a team play at a first resolution; and a second extraction means for employing a displacement in a positional relationship among said extracted players so as to extract movements of said players and said player groups at the first resolution.

9. A computer program embodied in a computer readable medium for performing team play analysis by enabling a computer to execute the steps of:

automatically extracting, from image data, each player and each player group participating in a team play at a first resolution;

employing a displacement in a positional relationship among players so as to automatically extract movements of said each player and, said each player group at the first resolution; and displaying a relationship of the extracted movements in an abstract manner;

wherein said extracting step comprising the steps of:

forming a diagram that is subdivided into triangles while employing the players in each frame of the image data as nodes; and extracting the groups at the first resolution by a step of modifying said triangles of said diagram, wherein said step of modifying triangles is selected from the group of steps consisting of merging triangles and subdividing triangles.

10. The computer program according to claim 9, wherein said employing step comprising the steps of:

detecting topological changes that constitute changes off topological information in said diagram; and grouping said detected topological changes.

* * * * *